(12) United States Patent
Chen et al.

(10) Patent No.: US 10,296,389 B2
(45) Date of Patent: May 21, 2019

(54) TIME-BOUND CONDITIONAL RESOURCE DEALLOCATION

(71) Applicant: Red Hat, Inc., Raleigh, NC (US)

(72) Inventors: Huamin Chen, Westford, MA (US); Jay Vyas, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 239 days.

(21) Appl. No.: 15/266,576

(22) Filed: Sep. 15, 2016

(65) Prior Publication Data

US 2018/0074864 A1 Mar. 15, 2018

(51) Int. Cl.
*G06F 9/50* (2006.01)

(52) U.S. Cl.
CPC .......... *G06F 9/5016* (2013.01); *G06F 9/5022* (2013.01)

(58) Field of Classification Search
CPC ........................................ G06F 9/45533–9/548
See application file for complete search history.

(56) References Cited

U.S. PATENT DOCUMENTS

| | | | |
|---|---|---|---|
| 6,574,717 B1 | 6/2003 | Ngai et al. | |
| 6,820,122 B1* | 11/2004 | Mandler | G06F 9/52 707/999.202 |
| 8,893,128 B2 | 11/2014 | Levin et al. | |
| 2005/0183057 A1* | 8/2005 | Barghouthi | G06F 9/466 717/100 |
| 2005/0262072 A1* | 11/2005 | Chen | G06F 17/3051 |
| 2008/0052397 A1* | 2/2008 | Venkataraman | H04L 12/66 709/226 |
| 2011/0231853 A1* | 9/2011 | Murray | H04L 41/00 718/103 |
| 2012/0297395 A1* | 11/2012 | Marchand | G06F 9/5027 718/104 |

(Continued)

OTHER PUBLICATIONS

Design and Evaluation of a Resource Selection Framework for Grid Applications Chuang Liu, Lingyun Yang, Ian Foster, Dave Angulo Published: 2002.*

(Continued)

*Primary Examiner* — Dong U Kim
*Assistant Examiner* — Paul V Mills
(74) *Attorney, Agent, or Firm* — K&L Gates LLP

(57) ABSTRACT

Method and system for deallocating shared system resources. In an example, the system includes a memory storing a system resource allocation database, a processor running a scheduler, including an I/O and a scheduler engine. The scheduler receives a request to deallocate a first plurality of system resources, which includes a first and a second system resource. The scheduler then updates the system resource allocation database at a starting time by marking the first and the second system resource both as conditionally available including inserting a first time-to-live timestamp and a second time-to-live timestamp associated with the first and the second system resource respectively. The scheduler updates the system resource allocation database including removing the first time-to-live timestamp and the second time-to-live timestamp after the first time-to-live timestamp and the second time-to-live timestamp have expired and the first system resource and the second system resource have been confirmed to be available.

20 Claims, 6 Drawing Sheets

(56) References Cited

U.S. PATENT DOCUMENTS

| | | | |
|---|---|---|---|
| 2013/0103835 A1* | 4/2013 | Yotsutani | G06F 9/4887 709/225 |
| 2014/0108663 A1 | 4/2014 | Peters et al. | |
| 2015/0160977 A1* | 6/2015 | Accapadia | G06F 9/5083 718/104 |
| 2016/0072725 A1* | 3/2016 | Amann | H04L 47/762 709/226 |

OTHER PUBLICATIONS

Guarantee of Freshness in Resource Information Cache on WSPE: Web Service Polling Engine Fumio Machida, Masahiro Kawato, Yoshiharu Maeno (Year: 2006).*

Awan: Locality-aware Resource Manager for Geo-distributed Data-intensive Applications Albert Jonathan, Abhishek Chandra, and Jon Weissman (Year: 2016).*

* cited by examiner

200

| System Resource Allocation Database 145 | | |
|---|---|---|
| CPU Cores 1 210a | Available 230a | Null 250a |
| CPU Cores 2 210b | Cond. Avail. 230b | TTL 1 250b |
| CPU Cores 3 210c | Unavailable 230c | Null 250c |
| GPU Slices 1 212a | Available 232a | Null 252a |
| GPU Slices 2 212b | Cond. Avail. 232b | TTL 2 252b |
| GPU Slices 3 212c | Unavailable 230c | Null 252c |
| System Memory 1 214a | Available 234a | Null 254a |
| System Memory 2 214b | Cond. Avail. 234b | TTL 3 254b |
| System Memory 3 214c | Unavailable 230c | Null 254c |
| Cache Memory 1 216a | Available 236a | Null 256a |
| Cache Memory 2 216b | Cond. Avail. 236b | TTL 4 256b |
| Cache Memory 3 216c | Unavailable 230c | Null 256c |
| Hard Disk Space 1 218a | Available 238a | Null 258a |
| Hard Disk Space 2 218b | Cond. Avail. 238b | TTL 5 258b |
| Hard Disk Space 3 218c | Unavailable 230c | Null 258c |
| Network Bandwidth 1 220a | Available 240a | Null 260a |
| Network Bandwidth 2 220b | Cond. Avail. 240b | TTL 6 260b |
| Network Bandwidth 3 220c | Unavailable 230c | Null 260c |
| External IP Address 1 222a | Available 242a | Null 262a |
| External IP Address 2 222b | Cond. Avail. 242b | TTL 7 262b |
| External IP Address 3 222c | Unavailable 230c | Null 262c |
| Network Route 1 224a | Available 244a | Null 264a |
| Network Route 2 224b | Cond. Avail. 244b | TTL 8 264b |
| Network Route 3 224c | Unavailable 230c | Null 264c |

Fig.2

TIME-BOUND CONDITIONAL RESOURCE DEALLOCATION

BACKGROUND

The present disclosure generally relates to improving the deallocation and allocation of shared system resources. In many settings, there are numerous isolated guests running on a shared computing platform (e.g., containers or virtual machines). These isolated guests need to have computing resources allocated to them to perform their required functions. The shared computing resources must be tracked to prevent their simultaneous or conflicting allocation to different isolated guests.

SUMMARY

The present disclosure provides a new and innovative system, methods and apparatus for deallocating shared system resources. In an example, the system includes a memory, including a system resource allocation database stored in the memory, with one or more processors in communication with the memory and a scheduler, including an input/output module and a scheduler engine running on the one or more processors. A request to deallocate a first plurality of system resources is received by the input/output module. The first plurality of system resources includes both a first and a second system resource. After receiving the request to deallocate the first plurality of system resources, the scheduler updates the system resource allocation database at a starting time by marking the first and the second system resource both as conditionally available. As part of marking the first and the second system resource as conditionally available, the scheduler inserts a first time-to-live timestamp and a second time-to-live timestamp associated with the first and the second system resource respectively. After a period of time elapses, the scheduler updates the system resource allocation database including removing the first time-to-live timestamp and the second time-to-live timestamp after the first time-to-live timestamp and the second time-to-live timestamp have expired and the first system resource and the second system resource have been confirmed to be available.

Additional features and advantages of the disclosed method and apparatus are described in, and will be apparent from, the following Detailed Description and the Figures.

BRIEF DESCRIPTION OF THE FIGURES

FIG. 2 illustrates an example table from the system resource allocation database according to an example of the present disclosure.

DETAILED DESCRIPTION OF EXAMPLE EMBODIMENTS

Figure 1:
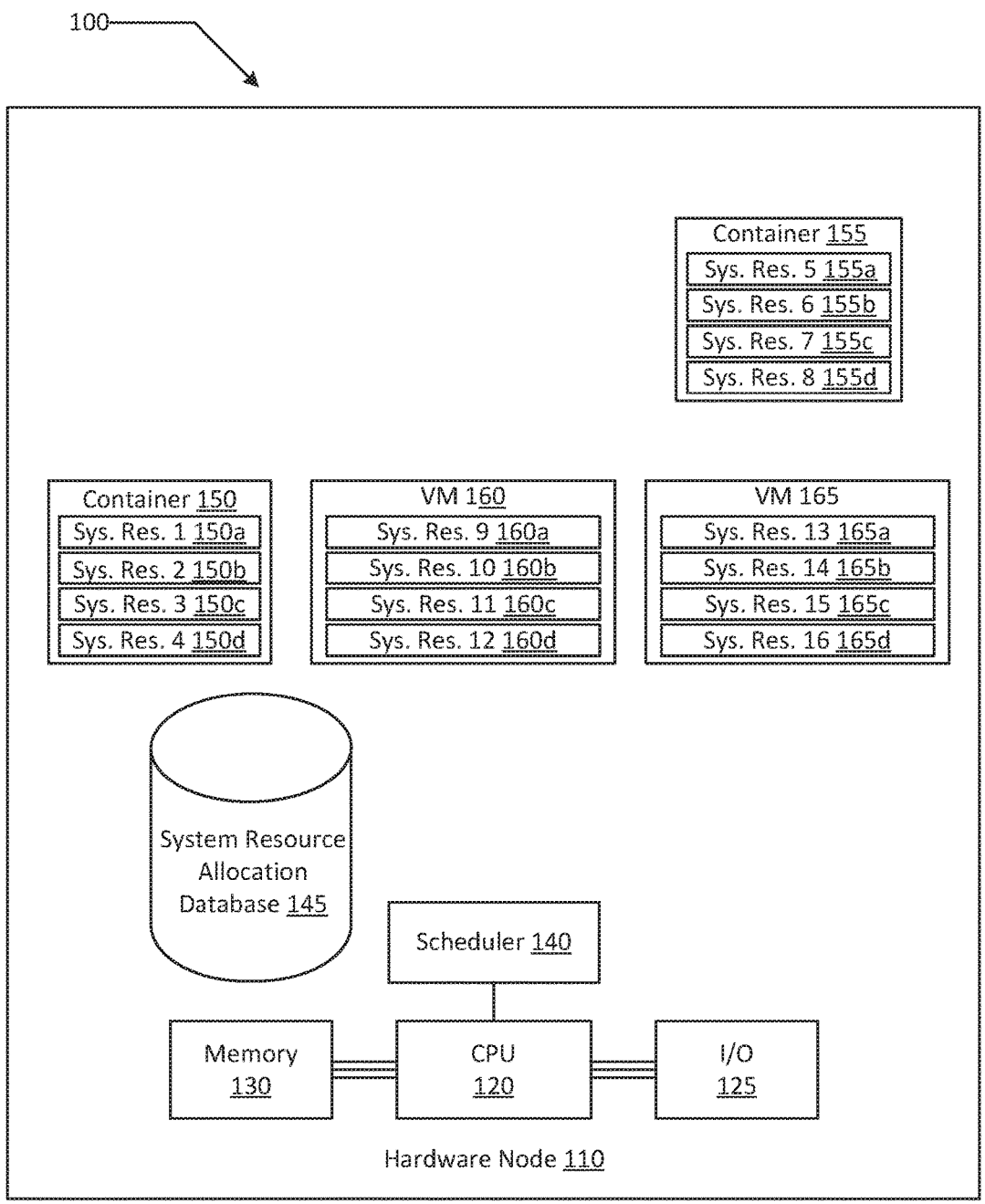
FIG. 1 is a block diagram of an example system utilizing shared resources allocated via a system resource allocation database according to an example of the present disclosure.

In computer systems, isolated guests can be used for creating hosting environments for running application programs. A computer system may use a container based virtualization system such as Docker®, or a system where stand alone virtualized operating systems are created including the use of a hypervisor. The runtime environment necessary for the running of desired application code can be loaded onto the computer system in the form of isolated guest, for example, a Docker® container or a virtual machine. To operate, these isolated guests need to have system resources allocated to them, for example, CPU (cores or shares), Graphics Processing Unit "GPU" (cores or slices), memory (size and I/O rates), persistent storage (size and I/O rates), network bandwidth, IP addresses, network routes, etc. In large scale implementations, container schedulers, for example container orchestrators such as Kubernetes, generally respond to frequent container startups and cleanups with low latency. System resources are generally allocated before isolated guests start up and released for re-use after isolated guests exit.

The availability and allocation of system resources may be managed by a system resource allocation database, as is usually the case in, for example, a Docker® implementation. Each type of system resource may be tracked by entries in a database, for example a database table. In some implementations, a table in the system resource allocation database may contain all records of CPU and memory utilization on the physical host, while another table may contain persistent storage allocations and yet another table contains IP address allocations.

The data in the system resource allocation database is generally kept up to date to avoid errors in allocating resources to new isolated guests. The system resources represented in the system resource allocation database are generally labeled with one of two states, either available or unavailable. The scheduler may query the system resource allocation database to discover if resources requested for a new container are available, and then update the system resource allocation database once an allocation of the resources is made. After an isolated guest exits and releases the system resources that were allocated to the isolated guest, the system resource allocation database may be updated to reflect the current system resource availability. These updates may be done upon verification of each individual system resource being deallocated after an isolated guest shuts down.

In a typical scenario, a request may be made to create a new container with 2 CPU cores, 128 MB of RAM, 1 external IP address, 100 GB of persistent storage, and 1 GB of network bandwidth. The scheduler may query the system resource allocation database to discover if there are sufficient unallocated system resources in the host machine to fulfill this request. If the queries return that there are sufficient resources, the scheduler may then reserve these resources for the new container. Once the new container finishes its job and exits, typically the host deallocates the resources while the scheduler updates the system resource allocation database as each shared system resources are deallocated. Resource deallocation may be a lengthy process, for example, deallocating persistent storage may require unmounting a file system from the host machine, including communications with a storage provider to delete the file system or to unmask logical unit numbers. In another example, removing external IP addresses and network routes may involve communicating with network controllers to release certain rules associated with these resources. The scheduler may choose to perform only batch updates, thus reducing the frequency of writing to the system resource allocation database, but extending the hold on system resources that have been deallocated. Alternatively, the scheduler may choose to update more frequently whenever any system resource becomes available, maximizing resource availability time at the cost of frequent updates and potential locks to the database.

Maximal availability of system resources is generally desired to maximize utilization of hardware, but the result of pursuing maximal availability of system resources is a high number of updates to the system resource allocation database. Less frequent database updates lead to stale allocation status and consequently, in many cases, lower resource utilization and/or making suboptimal scheduling decisions.

The present disclosure provides for highly updated data in the system resource allocation database, with reduced blockages and updates to the system resource allocation database by providing near real-time data in the system resource allocation database, while moving part of the processing load for keeping live data to the scheduler, resulting in higher database availability along with high system resource utilization. The disclosed methods utilize a third state for system resources in the system resource allocation database, allowing system resources to become conditionally available in addition to available and unavailable. In an example, the scheduler may, upon receiving notice that an isolated guest (e.g., Docker® container or virtual machine) is finished with its task and ready to be shut down. When the scheduler receives a request to deallocate the system resources associated with the isolated guest, the scheduler updates the system resource allocation database indicating that all of the system resources assigned to the isolated guest are conditionally available, while also providing each respective system resource with its own time-to-live timestamp indicating when that system resource is expected to become available. As a result, when, for example, the scheduler then queries the system resource allocation database to allocate resources to a new isolated guest, the scheduler will receive near-real time predictive results for the availability of system resources, including both available, and conditionally available resources. In an example, if the scheduler cannot allocate all of the resources required for a new isolated guest out of the pool of system resources labeled available, it may then query the conditionally available resources directly to discover if they are available for use. In an example, the live updates to the system resource allocation database for deallocating resources could be queued to be processed in a batch, thus potentially reducing the number of database updates for system resource availability status from one update per resource to two updates total for all of the resources associated with an isolated guest. Thus, the presently disclosed resource allocation database provides significant advantages over existing resource deallocation technology, including but not limited to: increasing system resource allocation database availability especially for queries, decreasing locks and writes on the system resource allocation database, more efficient execution of tasks, higher system resource utilization, less wasted compute time, reduced database contention, and reduced power consumption due to higher efficiency and compute load reducing the needed number of physical servers.

FIG. 1 depicts a block diagram of an example system 100 utilizing shared resources allocated via a system resource allocation database according to an example of the present disclosure. In an example, hardware node 110 may host one or more physical processors (e.g., CPU 120) communicatively coupled to respective memory devices (e.g., memory 130) and input/output devices (e.g., I/O 125). As used herein, physical processor or processor (120) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors 120 may be interconnected using a variety of techniques, ranging from a point-to-point processor interconnect, to a system area network, such as an Ethernet-based network. In an example, scheduler 140 may operate as a component of the hardware node 110 such as an executable program performing the functions of the scheduler 140 in the present disclosure. For example, an executable program of the scheduler 140 may be in a number of languages including ARM architecture assembly, Atmel AVR assembly, x86 assembly, Freescale 68HC11 assembly, Freescale v4e assembly, Motorola 680x0 assembly, MIPS assembly, PowerPC assembly, IBM System z assembly, TI MSP430 assembly, Zilog Z80 assembly, and machine code. Scheduler 140 may run on processors 120. Local connections within the scheduler 140 including, for example, the connections between processor 120 and memory 130 and between processor 120 and I/O device 125 may be provided by one or more local buses of suitable architecture, for example, peripheral component interconnect (PCI). In an example, the scheduler 140 may be a container orchestrator such as Kubernetes.

As discussed herein, a memory device 130 refers to a volatile or non-volatile memory device, such as RAM, ROM, EEPROM, or any other device capable of storing data. As discussed herein, I/O device 125 refers to a device capable of providing an interface between one or more processor pins and an external device capable of inputting and/or outputting binary data. The system resource allocation database 145 may be any suitable type of database running on the memory device 130, for example a relational database. The system resource allocation database 145 may be associated with a database management system (DBMS). A DBMS is a software application that facilitates interaction between the database and other components of the hardware node 110. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, the system resource allocation database 145 may be organized as a formal database with a schema such as a relational schema with defined tables, indices, links, triggers, various commands etc. In some examples, the system resource allocation database 145 may not be organized as a formal database, but may instead be an alternative storage structure capable of holding the information needed to provide a real-time status of shared system resources for the hardware node 110, including but not limited to a file, folder, directory, registry, etc. In some examples, the system resource allocation database 145 may reside over a network (not depicted), which may be, for example, a public network (e.g., the Internet), a private network (e.g., a local area network (LAN) or wide area network (WAN)), or a combination thereof.

In an example, hardware node 110 may additionally host numerous isolated guests, including but not limited to containers and virtual machines, for example, containers 150 and 155, and virtual machines 160 and 165. Containers 150 and 155 may be any form of operating system level virtualization, for example, Red Hat® OpenShift®, Docker® containers, chroot, Linux®-VServer, Solaris® Containers (Zones), FreeBSD® Jails, HP-UX® Containers (SRP), VMware ThinApp®, etc. Containers 150 and 155 may also run directly on the hardware node 110 or run within another layer of virtualization, for example, container 155 may run on virtual machine 165. Virtual machines 160 and 165 may utilize a hypervisor either as a software component running on a host operating system or directly on the hardware node 110 without an operating system as a means of providing virtual machines 160 and 165 with virtualized processors, memory, I/O devices. Virtual machines 160 and 165 may utilize any virtualization technology, including but not limited to Red Hat® Virtualization Manager™, Linux®-VServer™, Windows® Virtual PC™, various virtualization solutions available from ORACLE® CORPORATION and VMware®, etc. These isolated guests may additionally be associated with system resources that may be allocated to the isolated guests, for example, system resources 150a, 150b, 150c, 150d, 155a, 155b, 155c, 155d, 160a, 160b, 160c, 160d, 165a, 165b, 165c, and 165d. These system resources may be any form of system resource including but not limited to, for example, CPU (cores or shares), GPU (cores or slices), memory (size and I/O rates), persistent storage (size and I/O rates), network bandwidth, IP addresses, network routes, etc.

FIG. 2 illustrates an example table 200 from the system resource allocation database 145 according to an example of the present disclosure. In an example, there are rows in the system resource allocation database 145 corresponding to system resources 210a, 210b, 210c, 212a, 212b, 212c, 214a, 214b, 214c, 216a, 216b, 216c, 218a, 218b, 218c, 220a, 220b, 220c, 222a, 222b, 222c, 224a, 224b, and 224c, each row including a marking indicating the availability status of each respective system resource, marked in a column as one of, for example, available (e.g., markings 230a, 232a, 234a, 236a, 238a, 240a, 242a, and 244a), conditionally available (e.g., markings 230b, 232b, 234b, 236b, 238b, 240b, 242b, and 244b) and unavailable (e.g., markings 230c, 232c, 234c, 236c, 238c, 240c, 242c, and 244c). Each row corresponding to each respective system resource may also be marked in another column with a time-to-live timestamp (e.g., markings 250b, 252b, 254b, 256b, 258b, 260b, 262b, 264b, and 264c) or contain a null value (e.g., 250a, 250c, 252a, 252c, 254a, 254c, 256a, 256c, 258a, 258c, 260a, 260c, 262a, 262c, 264a, and 264c). In an example, system resources may also be marked as conditionally available by marking the availability column with a time-to-live timestamp instead of with an indication for available or unavailable. In an example, only system resources that are conditionally available (e.g., system resources 210b, 212b, 214b, 216b, 218b, 220b, 222b, and 224b) would have any data markings in a time-to-live timestamp column (e.g., time-to-live timestamps 250b, 252b, 254b, 256b, 258b, 260b, 262b, and 264b). The time-to-live timestamps 250b, 252b, 254b, 256b, 258b, 260b, 262b, and 264b may be times in the future (and not yet elapsed), the present time, or times in the past (already elapsed).

A system resource 210c, 212c, 214c, 216c, 218c, 220c, 222c, 224c marked as unavailable may either be currently allocated to an isolated guest (e.g., containers 150 and 155, or virtual machines 160 and 165), or have been determined to be unavailable for any reason by, for example, the scheduler 140 or the hardware node 110. In an example, the scheduler 140 may allocate system resources 210a, 212a, 214a, 216a, 218a, 220a, 222a, 224a which are available before system resources which are labeled as conditionally available 210b, 212b, 214b, 216b, 218b, 220b, 222b, 224b. The scheduler 140 may additionally verify that a system resource marked conditionally available 210b, 212b, 214b, 216b, 218b, 220b, 222b, 224b is actually available before allocating it to any isolated guest. In an example, the scheduler 140 may verify that system resources marked as conditionally available 230b, 232b, 234b, 236b, 238b, 240b, 242b are actually available based on the age of the system resources' associated time-to-live timestamps 250b, 252b, 254b, 256b, 258b, 260b, 262b, 264b, prioritizing the verification process to verify the status of system resources with the oldest time-to-live timestamps first. In an example, the older a time-to-live timestamp, the more likely it is that a system resource 210b, 212b, 214b, 216b, 218b, 220b, 222b, 224b is actually available. In an example, the scheduler 140 may update the availability 230a, 232a, 234a, 236a, 238a, 240a, 242a, 244a, 230b, 232b, 234b, 236b, 238b, 240b, 242b, 244b, 230c, 232c, 234c, 236c, 238c, 240c, 242c, 244c or time-to-live timestamp 250a, 250c, 252a, 252c, 254a, 254c, 256a, 256c, 258a, 258c, 260a, 260c, 262a, 262c, 264a, 264c, 250b, 252b, 254b, 256b, 258b, 260b, 262b, 264b, 264c cells upon a trigger for a batch update, for example, a set number of updates being queued up, a set time elapsing, and/or an update being triggered to add additional time-to-live timestamps to the system resource allocation database 145.

Figure 3:
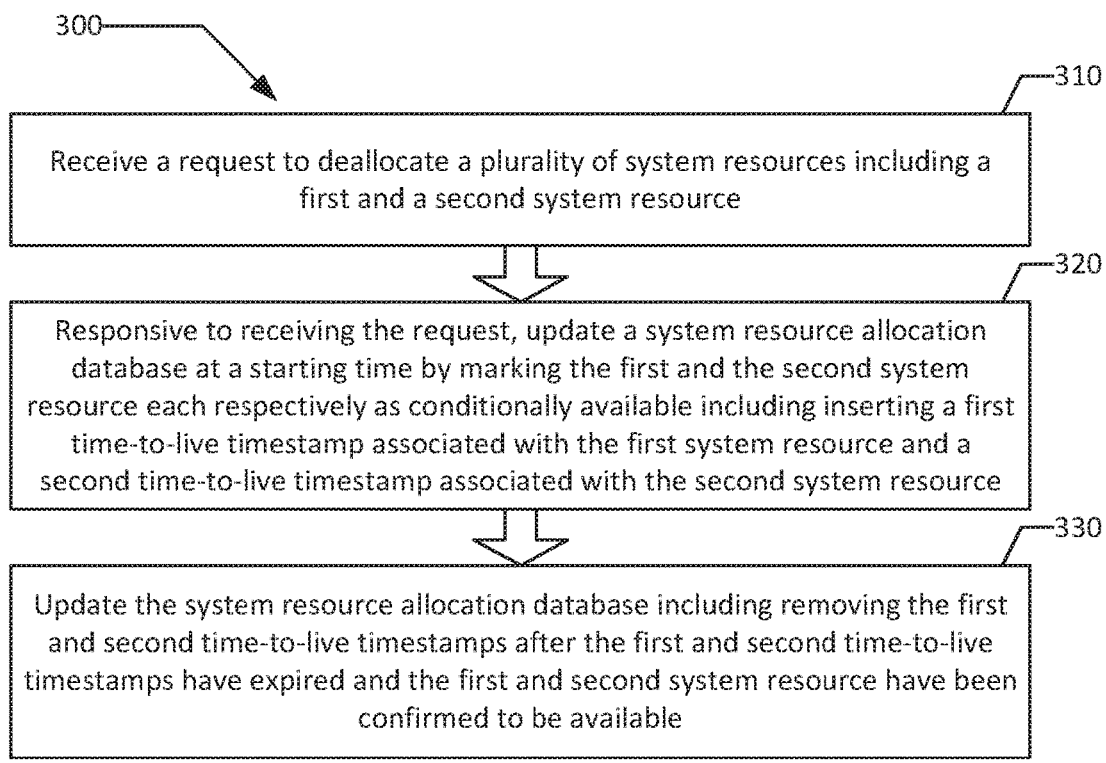
FIG. 3 is a flowchart illustrating an example process for updating the system resource allocation database indicating the deallocation of system resources according to an example of the present disclosure.

FIG. 3 illustrates a flowchart an example process for updating the system resource allocation database indicating the deallocation of system resources according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method is performed by a scheduler 140.

The example method 300 starts with receiving a request to deallocate a first plurality of system resources, where the first plurality of system resources includes a first system resource and a second system resource (block 310). In an example using illustrated systems 100 and 200, the scheduler 140 may receive a request to deallocate the system resources allocated to container 150, namely system resources 150a, 150b, 150c, 150d. In an example, system resources 150*a*, 150*b*, 150*c*, 150*d* may correlate respectively with system resources 210*b*, 212*b*, 214*b*, 216*b*, where system resources 210*b* and 212*b* may be the first and second system resource.

In response to receiving the request to deallocate the first plurality of system resources, a system resource allocation database is updated at a starting time by marking the first system resource as conditionally available, including inserting a first time-to-live timestamp associated with the first system resource and marking the second system resource as conditionally available, including inserting a second time-to-live timestamp associated with the second system resource (block 320). For example, the scheduler 140 may update the rows in system resource allocation database 145 corresponding to system resources 210*b*, 212*b*, 214*b*, 216*b* with information indicating that system resources 210*b*, 212*b*, 214*b*, 216*b* have been deallocated. The updates may include changing the availability column, including cells 230*b*, 232*b*, 234*b* and 236*b* from a state of unavailable, showing that system resources 210*b*, 212*b*, 214*b*, 216*b* were allocated to container 150, to a state of conditionally available. Additionally, in the example, a timestamp column may be updated with time-to-live timestamps, including adding a time-to-live timestamp in cells 250*b*, 252*b*, 254*b*, 256*b*.

In another example, the first plurality of system resources includes each system resource utilized by an isolated guest, and each system resource in the first plurality of system resources may be marked as conditionally available in the system resource allocation database. In an example, each system resource in the system resource allocation database may be marked as one of available, conditionally available, and unavailable. For example, there may be a column in system resource allocation database 145 associated with certain system resources where the cells in the column may be one of three states, available, conditionally available, and unavailable. In an example, the label used for conditionally available may be a time-to-live timestamp.

In an example, verification signals indicating that members of the first plurality of system resources including at least the first system resource and the second system resource have been successfully deallocated may be queued. For example, scheduler 140 may queue up responses from hardware node 110 that system resources 210*b*, 212*b*, 214*b*, 216*b* have been successfully deallocated, waiting for a trigger to update cells 230*b*, 232*b*, 234*b* and 236*b* in the system resource allocation database 145.

In an example, the first time-to-live timestamp and the second time-to-live timestamp are times in the future relative to when the first time-to-live timestamp and the second time-to-live timestamp were created. A first delay associated with the first time-to-live timestamp is based on a first categorization of the first system resource, the first delay being added to the starting time to calculate the first time-to-live timestamp, and a second delay associated with the second time-to-live timestamp is based on a second categorization of the second system resource, the second delay being added to the starting time to calculate the second time-to-live timestamp. In an example, the first delay and the second delay are retrieved from a file. In an example using illustrated systems 100 and 200, scheduler 140 may retrieve from a file a first delay and a second delay, using the first delay and the second delay to calculate the time in time-to-live timestamps 250*b* and 252*b* based on the starting time. In an example, the file containing the delays may be any suitable storage such as a file, a folder, a directory, a registry, or metadata from, for example, memory device 130, or the delays may be retrieved over a network.

In some examples, the delays in the file may be loaded from a network resource or central repository, or the file may be pre-populated when hardware node 110 is initialized. In other examples, the scheduler 140 may play a part in calculating and/or updating the delays associated with individual categories of system resources (e.g., CPU (cores or shares), GPU (cores or slices), memory (size and I/O rates), persistent storage (size and I/O rates), network bandwidth, IP addresses, network routes, etc.). In an example, the scheduler 140 may determine an amount of time that elapsed between the starting time and when the first system resource 210*b* was successfully deallocated and then update the file to include the amount of time that elapsed. In an example, the scheduler 140 may recalculate the first delay using some combination of the amount of time that elapsed for the first system resource 210*b* to fully deallocate and other times that elapsed for a second plurality of system resources (e.g., 210*a* and 210*c*) to deallocate previously, the second plurality of system resources having the categorization of the first system resource. In an example, the delay may be based on an average (e.g., mean, median or mode) or any statistically significant calculation of the elapsed times for successful deallocation of each respective system resource type (e.g., a weighted moving average).

In another example, a signal that the second system resource will not be successfully deallocated before the second time-to-live timestamp may be received. The system resource allocation database may then be updated indicating that the second system resource is unavailable. For example, the scheduler 140 may receive a signal that system resource 212*b* will not be successfully deallocated prior to the time in time-to-live timestamp 252*b*, and the scheduler 140 may update the availability cell 232*b* to show that system resource 212*b* is unavailable. The scheduler may also update cell 252*b* to remove the time-to-live timestamp. In an example, the signal received by the scheduler 140 may be a response to a query by the scheduler 140 to the hardware node 110 requesting the status of system resource 212*b*, or an error message sent directly to the scheduler 140 by hardware node 110.

In an example, updates to the system resource allocation database indicating that the first system resource and the second system resource are available may be queued, waiting for one of a time period to elapse, a number of system resources to be successfully deallocated, or receiving a request to deallocate a second plurality of system resources. For example, the scheduler 140 may wait to update cells 230*b*, 232*b*, 234*b* and 236*b* in the system resource allocation database 145 until a time period elapses, for example the time period may be the longest period of time added to any one of the time-to-live timestamps 250*b*, 252*b*, 254*b*, and 256*b*, or the time period may be, for example, a set number of seconds since the last update to system resource allocation database 145, such as 10 seconds. In another example, the scheduler 145 may queue updates to cells 230*b*, 232*b*, 234*b* and 236*b* indicating that system resources 210*b*, 212*b*, 214*b*, 216*b* have been successfully deallocated until all of the system resources 210*b*, 212*b*, 214*b*, 216*b* have been successfully deallocated, or until a set number of success messages have been queued, for example, 10 success messages. In yet another example, scheduler 140 may update system resource allocation database 145 where scheduler 140 receives a request to deallocate container 155, including system resources 160*a*, 160*b*, 160*c*, 160*d* associated with system resources 218*b*, 220*b*, 222*b*, 224*b*, where the scheduler may, simultaneous to marking cells 238*b*, 240*b*, 242*b*, 244*b* as conditionally available and cells 258*b*, 260*b*, 262*b*, and 264b with time-to-live timestamps, the scheduler 140 may update cells 230b and 232b to show that system resources 210b and 212b are available. In the example, system resources 214b and 216b may not yet have been deallocated successfully, and time-to-live timestamps 254b and 256b may not yet have expired.

In an example, a system may also verify, after an error checking time period has elapsed, whether the second system resource is available and repeat verifying whether the second system resource is available in intervals of the error checking time period until the second system resource is available, marking the second system resource as available in the system resource allocation database once the second system resource is confirmed to be available. For example, the scheduler 140, upon updating the system resource allocation database 145 in cell 232b with a status of unavailable for system resource 212b, the scheduler may start a timer (e.g., for 10 seconds), upon depletion of the timer, the scheduler 140 may again query the hardware node 110 regarding the status of system resource 212b, repeating this query every 10 seconds until system resource 212b is available. In some examples, there may be a lengthening or a shortening of the time period with each query-wait cycle. The scheduler 140 may also queue an update indicating that system resource 212b has become available, or alternatively may use the available response for system resource 212b to trigger an update cycle for all queued updates for system resource allocation database 145.

In the example method 300, the system resource allocation database may be updated, including the removal of the first time-to-live timestamp and the second time-to-live timestamp after the first time-to-live timestamp and the second time-to-live timestamp have expired and the first system resource and the second system resource have been confirmed to be available (block 330). For example, the scheduler 140 may update the system resource allocation database 145, specifically cells 230b and 232b to indicate that system resources 210b and 212b are available, and to update cells 250b and 252b to remove time-to-live timestamps TTL 1 and TTL 2. The scheduler 140 may choose to perform the updates to cells 230b and 232b as part of a bulk update along with updates to cells 234b and/or 236b etc., and may choose to perform the update upon a trigger, for example, the successful deallocation of all of the system resources 210b, 212b, 214b, 216b, after a time period has elapsed, upon receiving notice to deallocate system resources associated with container 155, or receiving a confirmation that a previously unavailable system resource in an error state has become available.

In an example, a request is received to allocate a second plurality of system resources to an isolated guest (e.g., a container or VM). In the example, a determination may be made whether there is a third system resource that is marked as available in a third plurality of system resources in the system resource allocation database, the third plurality of system resources having the categorization of the first system resource and including only system resources marked as available in the system resource allocation database. Upon determining that the third system resource exists, at least one member of the third plurality of system resources that are marked as available, including the third system resource, may be added to a list of system resources. The second plurality of system resources including the third system resource may then be allocated to the isolated guest. For example, the scheduler 140 may receive a request to allocate system resources to create VM 160, including system resources 160a, 160b, 160c, and 160d. In the example, scheduler 140 may query system resource allocation database 145 and discover that system resource 160a may be equivalent to system resource 210a or that system resource 160a may be allocated from a portion of system resource 210a, system resource 210a being labeled as available in cell 230a. Corresponding determinations may be made by scheduler 140 relating system resource 160b to system resource 212a, labeled as available in cell 232a, system resource 160c to system resource 214a, labeled as available in cell 234a, and system resource 160d to system resource 216a, labeled as available in cell 236a. The scheduler 140, upon determining that there are sufficient system resources marked as available in the system resource allocation database 145 to fulfill the request to create VM 160, may allocate those system resources to VM 160 and allow its creation.

Figure 4:
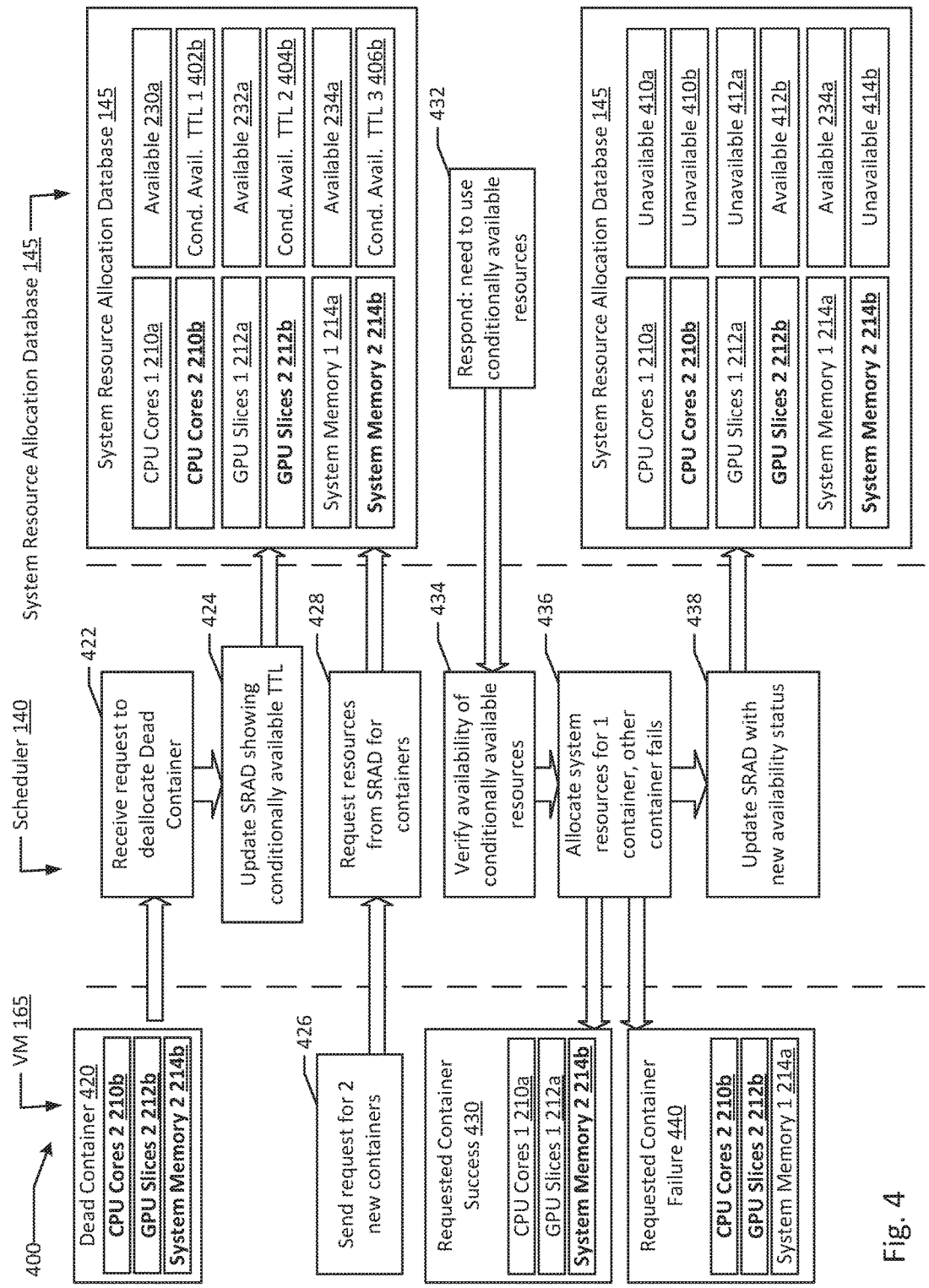
FIG. 4 is a flow diagram illustrating an example process for deallocating deprecated system resources and allocating the system resources to new uses according to an example of the present disclosure.

FIG. 4 depicts a flow diagram illustrating an example process for deallocating deprecated system resources and allocating the system resources to new uses according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 400, container 420 is a container running on virtual machine 165, container 420 having been associated with system resources 210b, 212b, 214b, and having completed its task and exited. In the example, VM 165 may request that scheduler 140 deallocate the system resources associated with dead container 420 (block 422). Scheduler 140 may then update system resource allocation database 145, specifically cells 402b, 404b, 406b each with a respective time-to-live timestamp indicating that system resources 210b, 212b, and 214b are conditionally available (block 424). System resource allocation database 145 may also be tracking the availability of system resources 210a, 212a, and 214a, marked as available in cells 230a, 232a, and 234a respectively.

In an example, VM 165 may then request the scheduler 140 to provision system resources for two additional containers, to be run on VM 165 (block 426). In the example, upon receiving the request for new containers, scheduler 140 may query the system resource allocation database to discover if there are sufficient available system resources to provision the requested containers (block 428). The system resource allocation database 145 may respond to the query from the scheduler 140 indicating that the requested system resources for provisioning the new containers may only be fulfilled if conditionally available system resources are used (block 432). The scheduler 140 may then verify the availability of the conditionally available system resources 210b, 212b, and 214b by querying, for example, the hardware node 110 (block 434). In an example, the time-to-live timestamp 402b corresponding to system resource 210b may be expired, the time-to-live timestamp 404b corresponding to system resource 213b may not yet be expired, and the time-to-live timestamp 406b corresponding to system resource 214b may not yet be expired. The hardware node 110 may respond to the scheduler 140's queries indicating that system resource 210b is unavailable, while system resources 212b and 214b are now available.

In an example, the scheduler 140 may determine that to fulfill the request for two new containers, one container 430 needs to utilize system resources 210a, 212a and 214b, while another container 440 needs to utilize system resources 210b, 212b and 214a. The scheduler 140, upon determination that system resources 210a, 212a, 212b, 214a and 214b are available based on a combination of the information received from the system resource allocation database 145 and the hardware node 110, but that system resource 210b is unavailable, may respond to VM 165, notifying VM 165 that container 430 may be provisioned but that there are insufficient available system resources to provision container 440 (block 436). Container 430 may then be launched in VM 165, while container 440 may fail to launch. The scheduler 140 may then update the system resource allocation database 145 indicating that system resources 210a, 212a, and 214b are unavailable in cells 410a, 412a and 414b because they have been provisioned to container 430, that system resource 210b is unavailable in cell 410b as indicated by the hardware node 110, and that system resources 212b and 214a are available in cells 412b and 234a because container 440 failed to provision (block 438).

In a further example, a determination may be made after adding system resources marked as available to a list, whether the list includes sufficient system resources having the categorization of the first system resource to allocate all of the system resources having the categorization of the first system resource requested in the second plurality of system resources. In an example, system resources 224a, 224b and 224c may be system resources having the same categorization, system resource 224a being labeled as available in cell 244a with no associated time-to-live timestamp in cell 264a, system resource 224b being labeled as conditionally available in cell 244b associated with an expired time-to-live timestamp in cell 264b, and system resource 224c being labeled as conditionally available in cell 244c associated with a time-to-live timestamp that is yet to expire in cell 264c. In the example, the scheduler 140 may add system resource 224a to a list of system resources that are available for allocation to a new isolated guest. In an example, it may be determined that there are insufficient system resources in the list to fulfill the request, which triggers a determination whether there is a fourth system resource in a fourth plurality of system resources, the fourth plurality of system resources having the categorization of the first system resource, including only system resources marked as conditionally available in the system resource allocation database. In the example, each member of the fourth plurality of system resources is associated with a respective time-to-live timestamp that has elapsed, including at least the fourth system resource being associated with a third time-to-live timestamp that has elapsed. In an example, the fourth system resource is determined to exist and validated to have been successfully deallocated, with at least one member of the fourth plurality of system resources that are marked as conditionally available, including the fourth system resource, being added to the list of system resources. For example, the scheduler 140 may determine that the list containing system resource 224a does not contain enough system resources of the same categorization as system resource 224a to allocate the system resources requested by the new isolated guest. The scheduler 140 may then validate whether system resource 224b, marked as conditionally available in cell 244b with an expired time-to-live timestamp in cell 264b, is actually available. In response to determining that system resource 224b is actually available, system resource 224b may be added by the scheduler 140 to the list of system resources. In an example, the second plurality of system resources may be allocated to the isolated guest including at least the fourth system resource. For example, the scheduler 140 may allocate system resources 224a and 224b for the creation of the new isolated guest.

In a further example, a determination may be made after adding system resources marked as available and those marked as conditionally available with expired time-to-live timestamps, verified to be available, to the list, whether the list includes sufficient system resources having the categorization of the first system resource to allocate all of the system resources having the categorization of the first system resource requested in the second plurality of system resources. In an example, system resources 224a, 224b and 224c may be system resources having the same categorization, system resource 224a being labeled as available in cell 244a with no associated time-to-live timestamp in cell 264a, system resource 224b being labeled as conditionally available in cell 244b associated with an expired time-to-live timestamp in cell 264b, and system resource 224c being labeled as conditionally available in cell 244c associated with a time-to-live timestamp that is yet to expire in cell 264c. In the example, the scheduler 140 may add system resource 224a to a list of system resources that are available for allocation to a new isolated guest, and scheduler 140 may further add system resource 224b to the list of system resources after verifying that system resource 224b is available. In an example, it may be determined that there are insufficient system resources in the list to fulfill the request, which triggers a determination whether there is a fifth system resource in a fifth plurality of system resources, the fifth plurality of system resources having the categorization of the first system resource, including only system resources marked as conditionally available in the system resource allocation database. In the example, each member of the fifth plurality of system resources is associated with a respective time-to-live timestamp that is yet to elapse, including at least the fifth system resource being associated with a fourth time-to-live timestamp that is yet to elapse. In an example, the fifth system resource is determined to exist, and validated to have been successfully deallocated, with at least one member of the fifth plurality of system resources that are marked as conditionally available, including the fifth system resource, being added to the list of system resources. For example, the scheduler 140 may determine that the list containing system resources 224a and 224b does not contain enough system resources of the same categorization as system resources 224a and 224b to allocate the system resources requested by the new isolated guest. The scheduler 140 may then validate whether system resource 224c, marked as conditionally available in cell 244c with a time-to-live timestamp in cell 264c that has yet to expire, is actually available. In response to determining that system resource 224c is actually available, system resource 224c may be added by the scheduler 140 to the list of system resources. In an example, the second plurality of system resources may be allocated to the isolated guest including at least the fourth system resource. For example, the scheduler 140 may allocate system resources 224a, 224b and 224c for the creation of the new isolated guest.

In an example, it may be determined that the list of system resources has insufficient system resources having the categorization of the first system resource to fulfill the request, where the list includes the third system resource, the fourth system resource, and/or the fifth system resource. In the example, the response to the request may be that there are insufficient system resources to allocate the system resources requested in the second plurality of system resources. For example, the scheduler 140 may determine that to provision a new container requested by VM 165, two system resources of the same categorization are required (e.g., system memory), and that of the system resources with the proper categorization, system resource 214a is labeled as available in cell 234a, and system resource 214b is labeled as conditionally available in cell 406b. The scheduler 140 may further determine when the scheduler 140 queries the hardware node 110 to verify the status of system resource 214b that system resource 214b, which was labeled as conditionally available in cell 406b is in fact unavailable. Unable to locate enough system memory to fulfill the request from VM 165, the scheduler 140 may respond to VM 165 indicating that there are not enough available resources in hardware node 110 to fulfill the request.

In other examples, it may be the case that the scheduler succeeds in finding sufficient system resources of a specific categorization to allocate system resources for a new isolated guest where the system resources selected for allocation belong to any combination of available and conditionally available states. The scheduler may also fail to allocate system resources for a new isolated guest where the system fails to find sufficient resources of any particular categorization required for the creation of a new isolated guest. In an example, the scheduler may first attempt to allocate requested system resources from system resources labeled as available, then from system resources labeled as conditionally available with expired time-to-live timestamps, and finally from system resources labeled as conditionally available with time-to-live timestamps that have yet to expire. In a further example, the scheduler may prioritize the verification of whether a conditionally available resource is actually available based on the amount of time that has elapsed since the time in a system resources' time-to-live timestamp, or based on the amount of time remaining before a system resources' time-to-live timestamp elapses.

Figure 5:
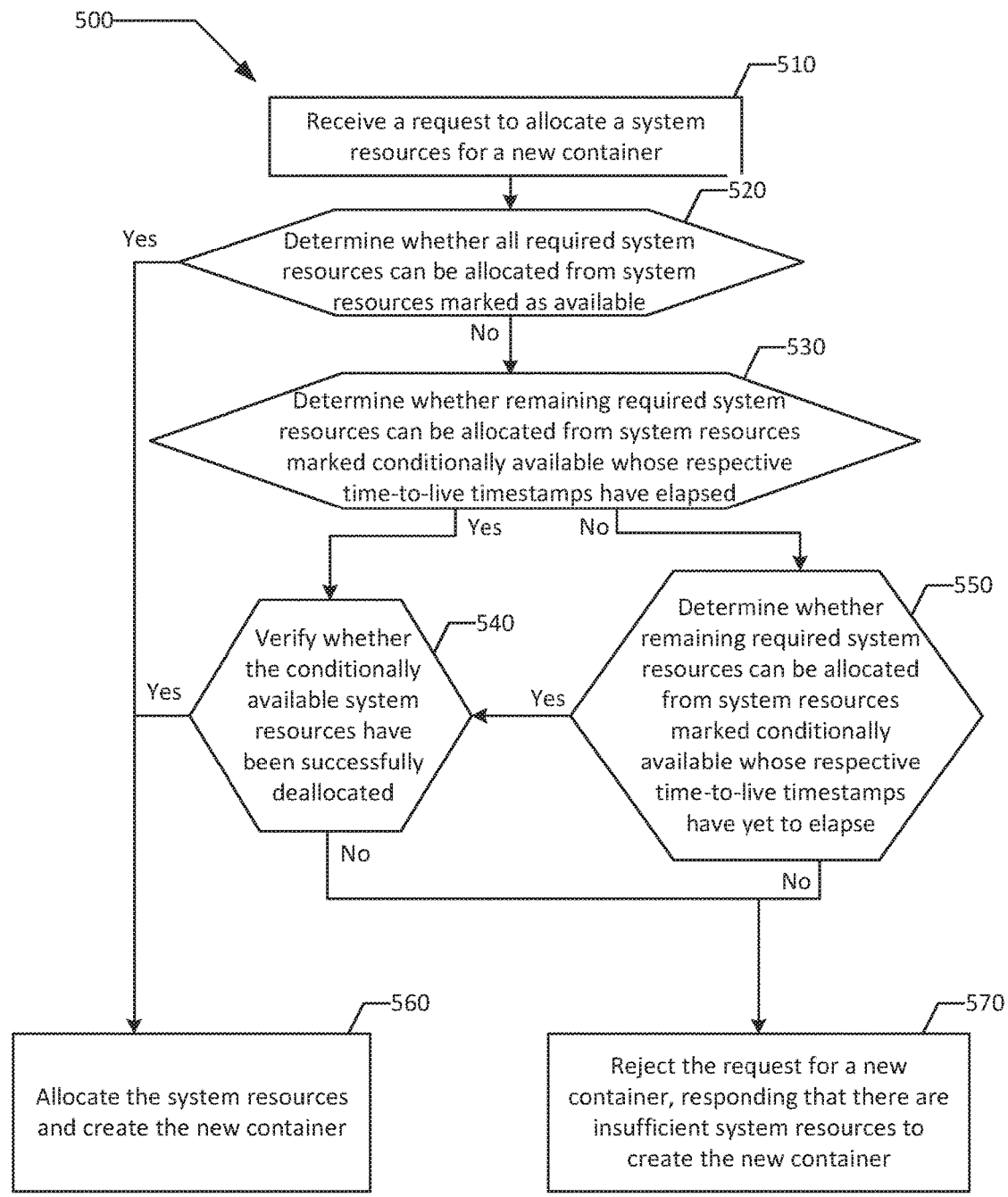
FIG. 5 is a flow diagram illustrating an example process and decision tree for allocating system resources according to an example of the present disclosure.

FIG. 5 depicts a flow diagram illustrating an example process and decision tree 500 for allocating system resources according to an example of the present disclosure. In an example, the scheduler 140 may receive a request for the allocation of a container including a list of system resource requirements (block 510). The scheduler 140 may first query the system resource allocation database 145 to determine whether all of the required system resources may be allocated from system resources marked as available, (block 520). If it is determined that there are sufficient available system resources, the scheduler 140 may allocate the system resources and create the new container (block 560), before updating the system resource allocation database 145 to show that the allocated system resources are unavailable.

In an example, if the scheduler 140 determines that the request cannot be fulfilled from system resources marked as available, the scheduler 140 may additionally query for system resources in the system resource allocation database 145 that are marked as conditionally available, with expired time-to-live timestamps (block 530). In some examples, system resources with time-to-live timestamps that have expired for a sufficient amount of time may be directly allocated as if they were marked as available. In an example, the scheduler 140 will verify with the hardware node 110 whether particular system resources labeled as conditionally available, that could be used to fulfill the allocation request, are actually available (block 540). If there are sufficient available system resources with the inclusion of the verified conditionally available system resources, the scheduler 140 may allocate the system resources and create the new container (block 560), before updating the system resource allocation database 145 to show that the allocated system resources are unavailable.

In an example, if the scheduler 140 determines that the request cannot be fulfilled from system resources marked as available with the addition of the system resources marked as conditionally available with time-to-live timestamps that have expired, and that have been verified as being actually available, the scheduler 140 may additionally query for system resources in the system resource allocation database 145 that are marked as conditionally available, with time-to-live timestamps that have not yet expired (block 550). In an example, the scheduler 140 will verify with the hardware node 110 whether particular system resources labeled as conditionally available, with time-to-live timestamps that have not yet expired, that could be used to fulfill the allocation request, are actually available (block 540). If there are sufficient available system resources with the inclusion of the verified conditionally available system resources, the scheduler 140 may allocate the system resources and create the new container (block 560), before updating the system resource allocation database 145 to show that the allocated system resources are unavailable. In some examples, the scheduler 140 may re-attempt its query to hardware node 110 until after the time-to-live timestamps on the conditionally available system resources expire. In an example, where the scheduler 140 cannot locate enough system resources to fulfill the allocation request for a new container with system resources marked as either available or conditionally available and verified to be available, the scheduler 140 may reject the request for a new container indicating that there are insufficient available system resources to create the new container (block 570).

Figure 6:
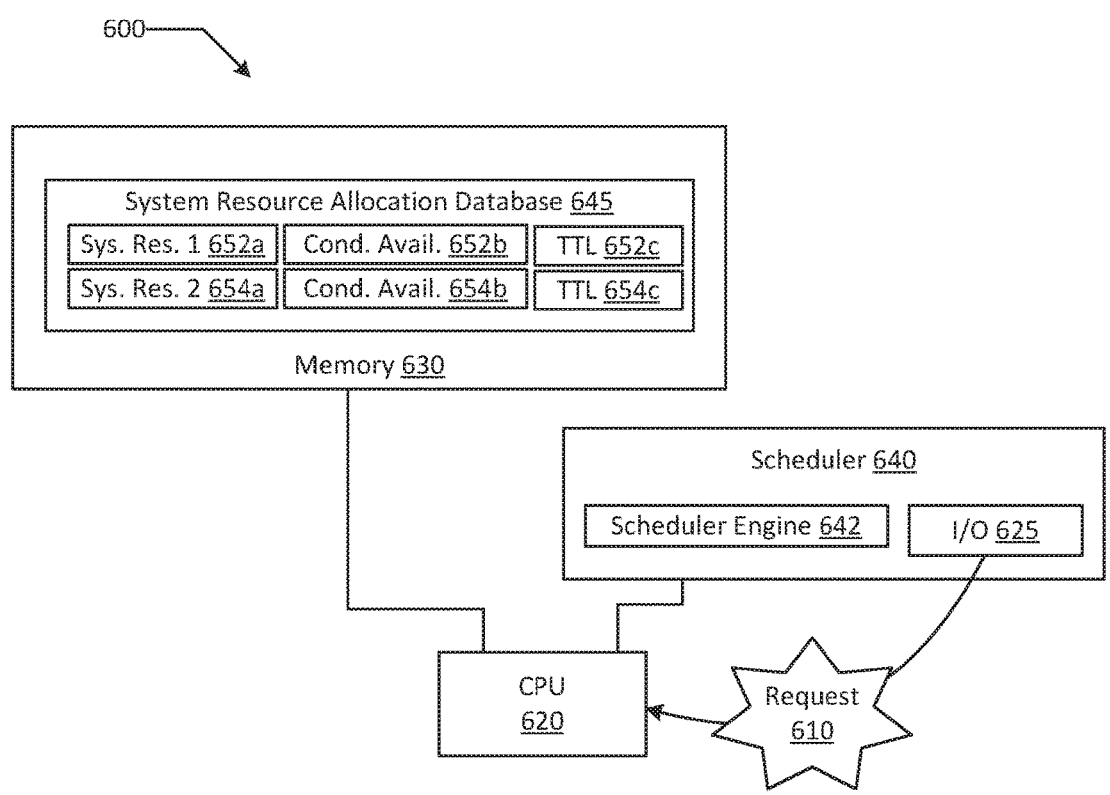
FIG. 6 is a block diagram of an example system of the core components of an example of the present disclosure.

FIG. 6 is a block diagram of an example system of the core components of an example of the present disclosure. Example system 600 includes a memory 630, one or more processors 620, in communication with the memory 630. a system resource allocation database 645 stored in the memory 630, a scheduler 640, executing on the one or more processors 620, which in turn includes an input/output module 625 and a scheduler engine 642. In an example, the input/output module 625 receives a request 610 to deallocate a first plurality of system resources that includes a first system resource 652a and a second system resource 654a, the system resources 652a and 654a being associated with an isolated guest (e.g., a container).

After receiving the request 610 to deallocate system resources 652a and 654, the scheduler 640 may update in the system resource allocation database 645 that the system resources 652a and 654a are conditionally available. In an example, system resource 652a may be marked as conditionally available 652b and with a time-to-live timestamp 652c in the system resource allocation database 645. Similarly, system resource 654a may be marked as conditionally available 654b and with a time-to-live timestamp 654c in the system resource allocation database 645.

After the scheduler 640 determines that the first system resource 652a and the second system resource 654a are both available, the scheduler 640 may update the system resource allocation database 645, including by removing the first time-to-live timestamp 652c and the second time-to-live timestamp 654c after the first time-to-live timestamp 652c and the second time-to-live timestamp 654c have both expired. In an example, system resource allocation database 645 may also be updated to show that system resource 652a and system resource 654a are now available.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for deallocating system resources, the method comprising:
   storing a system resource allocation database (SRAD) in a memory accessible by a scheduler which controls allocation and deallocation of a set of system resources, wherein the SRAD comprises an entry for each resource of the set system resources;
   receiving, by the scheduler, a first deallocation request for a first plurality of system resources of the set of system resources, including a first system resource and a second system resource;
   responsive to receiving the first deallocation request, updating, by the scheduler, the SRAD at a starting time by marking the first system resource SRAD entry as conditionally available, including inserting a first time-to-live timestamp (TTLT) associated with the first system resource SRAD entry and marking the second system resource SRAD entry as conditionally available, including inserting a second TTLT associated with the second system resource SRAD entry,
   wherein the first TTLT specifies a time in the future relative to the starting time calculated by adding a first delay value associated with a first type of the first system resource from a file to the starting time;
   updating, by the scheduler, the SRAD including removing the first TTLT and the second TTLT after the first TTLT and the second TTLT have expired and the first system resource and the second system resource have been confirmed to be available;
   receiving, by the scheduler, an allocation request for a requested set of system resources of a guest, wherein the requested set includes resources of the first type; and
   responsive to receiving the allocation request, performing, by the scheduler, an allocation process comprising:
      performing an available resource discovery including selecting from the SRAD any SRAD entries corresponding to the first type that are marked as available in a list;
      determining whether the list includes SRAD entries representing sufficient system resources to fulfill the allocation request;
      responsive to determining that there are insufficient system resources represented in the list to fulfill the allocation request, performing a first conditionally available resource discovery to identify a third system resource SRAD entry associated with the first type that is marked as conditionally available with an expired third TTLT, validating that the corresponding third system resource has been successfully deallocated, and adding the third system resource SRAD entry to the list;
      determining whether the list includes SRAD entries representing sufficient system resource to fulfill the allocation request; and
      responsive to determining that the list includes SRAD entries representing sufficient system resources, allocating at least a subset of the system resources associated with the list to the guest including the third system resource.

2. The method of claim 1, wherein the first plurality of system resources includes each system resource utilized by an exited guest, and responsive to receiving the first deallocation request, each system resource in the first plurality of system resources is marked as conditionally available in the SRAD.

3. The method of claim 1, wherein each system resource in the SRAD is marked as one of available, conditionally available, and unavailable.

4. The method of claim 1, further comprising:
   queuing verification signals indicating that members of the first plurality of system resources including at least the first system resource and the second system resource have been successfully deallocated; and
   waiting to update the SRAD to indicate that the first system resource and the second system resource are available for at least one of a time period to elapse, a number of system resources being successfully deallocated, and a receipt of a second deallocation request.

5. The method of claim 1, further comprising:
   determining an amount of time that elapsed between the starting time and when the first system resource is successfully deallocated;
   updating the file with the amount of time; and
   recalculating the first delay with at least one of the amount of time that elapsed, respectively, for the first system resource to successfully deallocate and other times elapsed associated with the first type of the first system resource.

6. The method of claim 1, further comprising:
   receiving a signal that the second system resource will not be successfully deallocated before the second TTLT;
   updating the second system resource SRAD entry indicating that the second system resource is unavailable; and
   verifying, after an error checking time period has elapsed, whether the second system resource is available, repeat verifying whether the second system resource is available in intervals of the error checking time period until the second system resource is available, and responsive to verifying that the second system resource is available, marking the second system resource SRAD entry as available in the SRAD.

7. The method of claim 1, further comprising:
   responsive to determining that there are insufficient system resources represented in the list to fulfill the allocation request after the first conditionally available resource discovery, performing a second conditionally available resource discovery to identify a fourth system resource SRAD entry associated with the first type that is marked as conditionally available with an unexpired fourth TTLT, validating that the corresponding fourth system resource has been successfully deallocated, and adding the fourth system resource SRAD entry to the list.

8. The method of claim 7, further comprising:
responsive to determining that there are insufficient system resources represented in the list to fulfill the allocation request after the second conditionally available resource discovery, responding to the allocation request indicating that there are insufficient system resources to execute the allocation request.

9. A system for deallocating system resources, the system comprising:
a memory;
one or more processors, in communication with the memory;
a system resource allocation database (SRAD) stored in the memory, wherein the SRAD comprise an entry for each resource of a set system resources;
a scheduler which controls allocation and deallocation of the set of system resources, executing on the one or more processors, including:
an input/output module; and
a scheduler engine,
wherein the one or more processors:
receive, from the input/output module, a first deallocation request for a first plurality of system resources of the set of system resources, including a first system resource and a second system resource;
responsive to receiving the request to deallocate the first plurality of system resources, update, by the scheduler, the SRAD at a starting time by marking the first system resource SRAD entry as conditionally available, including inserting a first time-to-live timestamp (TTLT) associated with the first system resource SRAD entry and marking the second system resource SRAD entry as conditionally available, including inserting a second TTLT associated with the second system resource SRAD entry,
wherein the first TTLT specifies a time in the future relative to the starting time calculated by adding a first delay value associated with a first type of the first system resource from a file to the starting time;
update, by the scheduler, the SRAD including removing the first TTLT and the second TTLT after the first TTLT and the second TTLT have expired and the first system resource and the second system resource have been confirmed to be available;
receive, by the scheduler, an allocation request for a requested set of system resources of a guest, wherein the requested set includes resources of the first type; and
responsive to receiving the allocation request, perform, by the scheduler, an allocation process comprising:
performing an available resource discovery including selecting from the SRAD any SRAD entries corresponding to the first type that are marked as available in a list;
determining whether the list includes SRAD entries representing sufficient system resources to fulfill the allocation request;
responsive to determining that there are insufficient system resources represented in the list to fulfill the allocation request, performing a first conditionally available resource discovery to identify a third system resource SRAD entry associated with the first type that is marked as conditionally available with an expired third TTLT, validating that the corresponding third system resource has been successfully deallocated, and adding the third system resource SRAD entry to the list;
determining whether the list includes SRAD entries representing sufficient system resource to fulfill the allocation request; and
responsive to determining that the list includes SRAD entries representing sufficient system resources, allocate at least a subset of the system resources associated with the list to the guest including the third system resource.

10. The system of claim 9, wherein the scheduler further executes to:
queues verification signals indicating that members of the first plurality of system resources including at least the first system resource and the second system resource have been successfully deallocated; and
wait to update the SRAD to indicate that the first system resource and the second system resource are available for at least one of a time period to elapse, a number of system resources being successfully deallocated, and a receipt of a second deallocation request.

11. The system of claim 9, wherein the scheduler further executes to:
receives a signal that the second system resource will not be successfully deallocated before the second TTLT;
updates the second system resource SRAD entry indicating that the second system resource is unavailable; and
verifies after an error checking time period has elapsed, whether the second system resource is available, repeat verifying whether the second system resource is available in intervals of the error checking time period until the second system resource is available, and responsive to verifying that the second system resource is available, marks the second system resource SRAD entry as available in the SRAD.

12. The system of claim 9, wherein the first plurality of system resources includes each system resource utilized by an exited guest, and responsive to receiving the first deallocation request, each system resource in the first plurality of system resources is marked as conditionally available in the SRAD.

13. The system of claim 9, wherein each system resource in the SRAD is marked as one of available, conditionally available, and unavailable.

14. The system of claim 9, wherein the scheduler further executes to:
determine an amount of time that elapsed between the starting time and when the first system resource is successfully deallocated;
update the file with the amount of time; and
recalculate the first delay with at least one of the amount of time that elapsed, respectively, for the first system resource to successfully deallocate and other times elapsed associated with the first type of the first system resource.

15. The system of claim 9, wherein responsive to determining that there are insufficient system resources represented in the list to fulfill the allocation request after the first conditionally available resource discovery, the scheduler performs a second conditionally available resource discovery to identify a fourth system resource SRAD entry associated with the first type that is marked as conditionally available with an unexpired fourth TTLT, validating that the corresponding fourth system resource has been successfully deallocated, and adding the fourth system resource SRAD entry to the list.

16. The system of claim 15, wherein responsive to determining that there are insufficient system resources represented in the list to fulfill the allocation request after the second conditionally available resource discovery, the scheduler responds to the allocation request, indicating that there are insufficient system resources to execute the allocation request.

17. A computer-readable non-transitory storage medium storing executable instructions, which when executed by a computer system, cause the computer system to:
store a system resource allocation database (SRAD) in a memory accessible by a scheduler which controls allocation and deallocation of a set of system resources, wherein the SRAD comprises an entry for each resource of the set system resources;
receive, by the scheduler, a first deallocation request for a first plurality of system resources of the set of system resources, including a first system resource and a second system resource;
responsive to receiving the first deallocation request, update, by the scheduler the SRAD at a starting time by marking the first system resource SRAD entry as conditionally available, including inserting a first time-to-live timestamp (TTLT) associated with the first system resource SRAD entry and marking the second system resource SRAD entry as conditionally available, including inserting a second TTLT associated with the second system resource SRAD entry,
wherein the first TTLT specifies a time in the future relative to the starting time calculated by adding a first delay value associated with a first type of the first system resource from a file to the starting time;
update, by the scheduler, the SRAD including removing the first TTLT and the second TTLT after the first TTLT and the second TTLT have expired and the first system resource and the second system resource have been confirmed to be available;
receive, by the scheduler, an allocation request for a requested set of system resources of a guest, wherein the requested set includes resources of the first type; and
responsive to receiving the allocation request, perform, by the scheduler, an allocation process comprising:
performing an available resource discovery including selecting from the SRAD any SRAD entries corresponding to the first type that are marked as available in a list;
determining whether the list includes SRAD entries representing sufficient system resources to fulfill the allocation request;
responsive to determining that there are insufficient system resources represented in the list to fulfill the allocation request, performing a first conditionally available resource discovery to identify a third system resource SRAD entry associated with the first type that is marked as conditionally available with an expired third TTLT, validating that the corresponding third system resource has been successfully deallocated, and adding the third system resource SRAD entry to the list;
determining whether the list includes SRAD entries representing sufficient system resource to fulfill the allocation request; and
responsive to determining that the list includes SRAD entries representing sufficient system resources, allocate at least a subset of the system resources associated with the list to the guest including the third system resource.

18. The computer-readable non-transitory storage medium of claim 17, wherein the executable instructions, when executed by the computer system, further cause the computer system to:
queue verification signals indicating that members of the first plurality of system resources including at least the first system resource and the second system resource have been successfully deallocated; and
wait to update the SRAD to indicate that the first system resource and the second system resource are available for at least one of a time period to elapse, a number of system resources being successfully deallocated, and a receipt of a second deallocation request.

19. The computer-readable non-transitory storage medium of claim 17, wherein the executable instructions, when executed by the computer system, further cause the computer system to:
receive a signal that the second system resource will not be successfully deallocated before the second TTLT;
update the second system resource SRAD entry indicating that the second system resource is unavailable; and
verify, after an error checking time period has elapsed, whether the second system resource is available, repeat verifying whether the second system resource is available in intervals of the error checking time period until the second system resource is available, and responsive to verifying that the second system resource is available, marking the second system resource SRAD entry as available in the SRAD.

20. The computer-readable non-transitory storage medium of claim 17, wherein the executable instructions, when executed by the computer system, further cause the computer system to:
responsive to determining that there are insufficient system resources represented in the list to fulfill the allocation request after the first conditionally available resource discovery, perform a second conditionally available resource discovery to identify a fourth system resource SRAD entry associated with the first type that is marked as conditionally available with an unexpired fourth TTLT, validating that the corresponding fourth system resource has been successfully deallocated, and adding the fourth system resource SRAD entry to the list; and
responsive to determining that there are insufficient system resources represented in the list to fulfill the allocation request after the second conditionally available resource discovery, responding to the allocation request, indicating that there are insufficient system resources to execute the allocation request.

* * * * *